United States Patent [19]
Zucker

[11] Patent Number: 5,439,566
[45] Date of Patent: Aug. 8, 1995

[54] SCALE CONTROL DEVICE AND METHOD

[76] Inventor: Jerry Zucker, 16 Buckingham Dr., Charleston, S.C. 29407

[21] Appl. No.: 225,659

[22] Filed: Apr. 11, 1994

[51] Int. Cl.⁶ .............................................. C02F 1/461
[52] U.S. Cl. .................... 204/149; 204/222; 204/275
[58] Field of Search ................... 204/149, 222, 275

[56] References Cited

U.S. PATENT DOCUMENTS

| | | | |
|---|---|---|---|
| 3,652,433 | 3/1972 | Thompson | 204/152 |
| 3,785,954 | 1/1974 | Herbert | 204/228 |
| 3,928,155 | 12/1975 | Woodhouse | 204/150 |
| 4,188,278 | 2/1980 | Reis et al. | 204/268 |

FOREIGN PATENT DOCUMENTS 0074530  3/1983  European Pat. Off. ............ 204/149

Primary Examiner—John Niebling
Assistant Examiner—Arun S. Phasge
Attorney, Agent, or Firm—Juettner Pyle Lloyd & Piontek

[57] ABSTRACT

Water containing scale forming materials is passed in a tortious path into contact with a series of alternating positively and negatively charged grids, causing scale to be selectively deposited on the grids. The grids are vibrated periodically to break up the scale into fine particles, which do not redissolve or form scale elsewhere.

9 Claims, 2 Drawing Sheets

SCALE CONTROL DEVICE AND METHOD

BACKGROUND OF THE INVENTION

Many industrial devices utilize a water supply, which is evaporated for the purposes of heating, cooling, power generation and the like. All untreated water supplied contain quantities of multivalent metallic salts, especially those based on calcium and magnesium. In the process of evaporating the water, the salts become concentrated to a point to where they precipitate out of solution in the form of a scale, i.e., an insoluble, crusty coating throughout the functional parts of the apparatus. The formation of scale is generally undesirable because the scale is a poor conductor of heat and may otherwise interfere with the efficiency of the apparatus. Removal of scale also usually requires shut-down of the apparatus to enable mechanical and/or chemical cleaning. Also, in general, it would be desirable to provide a method and apparatus for causing selective disposition of solutes which are at or near saturation point in a solution.

SUMMARY OF THE INVENTION

In accordance with the broad aspect of the present invention, solutes which are near saturation in an aqueous solution are caused to precipitate prematurely out of solution by directing a flow of the solution over spaced grids or electrodes to which opposite electrical changes have been applied from an external power source, by which electric potential gradient is established between the grids. It is believed that galvanic action present in the electrolyte causes the instantaneously local solubility product constant (Ksp) of ions in solution to be lowered. This effect is particularly true in the case of ions that combine to precipitate scales, such as carbonates, sulfates and silicates of calcium, barium, magnesium and aluminum. The apparatus of the invention is designed in such a manner such that, in an evaporative or similar system, as the saturation point of the scalents in solution are approached, the Ksp is reduced in a localized fashion to cause precipitation of the scale in a location where the scale will not cause interference with the primary apparatus of concern.

In accordance with the preferred embodiment of the present invention, a separate flow-through treatment chamber or conduit is provided to minimize the possibility of scale formation in the remainder of the water system. The chamber includes a water inlet and outlet and has a plurality of baffles therein to cause the flow of water therein to move in an undulating or irregular path.

The flow chamber contains a series of flexible, electrically isolated, electrode surfaces, which are disposed in the flow path of the water. Alternative surfaces are positively and negatively charged by an external power source and selectively attract the deposit of scale thereon.

Means, such as a vibrator, are attached to the electrodes surfaces in order to agitate the surfaces periodically. The vibrator breaks up and removes the deposited scale from the electrode surfaces, whereupon the scale is transformed into small particles, which are carried away by the continuous flow of water.

Since the scale particles that are removed from the electrode surfaces tend to remain insoluble, such impurities remain entrained in the water and do not redeposit as a scale elsewhere. If desired, the particles can be removed by filtration, settling, or other separation techniques.

DESCRIPTION OF THE PREFERRED EMBODIMENT

In general, the present invention resides in a method and apparatus for causing localized, premature precipitation of solutes out of a flowing polar solvent, particularly where the solute is nearing its saturation point. The invention is therefore especially suitable to applications wherein the concentration of ions in solution is being constantly increased, for example, due to evaporation of the solvent. A particularly suitable application is in the removal of sparingly soluble impurities in water as the concentration thereof nears the saturation point due to evaporation of the water.

In accordance with the present invention, two or more electrode grids or conductors are disposed in a confined conduit, and the water is caused to continuously flow across the grids. The grids are connected to a source of electric current to cause a positive potential at one grid and a negative potential at the other. The electric field thus produced between the grids causes the solubility product constant (Ksp) of the solute ions to be slightly lowered in the vicinity of the conductors. This, in turn, causes ions near saturation point to precipitate out of solution and selectively adhere to the grids. It is noteworthy that this phenomenon is not observed unless a flow is created between the electrodes, and the ion in solution are very near to their saturation point.

In general, the amount of liquid or water flowing through the device will depend on the effective diameter of the passageway. The velocity of the liquid or water will generally be in excess of 5 feet per second and may extend up to in the order of 10 to 15 feet per second.

The amount of current or electrical power supplied from the external source to the electrode grids is insufficient to cause any significant electrolysis of the water, which would cause undesirable formation of gas and may interfere with the precipitation mechanism. The application of an external potential difference between the electrodes does not cause any substantial reaction with the electrode surfaces, which are preferably all formed of the same nonreactive conductive materials.

The present invention will be described in connection with a water recirculation system, although it will be appreciated that the principles of the invention are applicable to a variety of uses.

Figure 1:
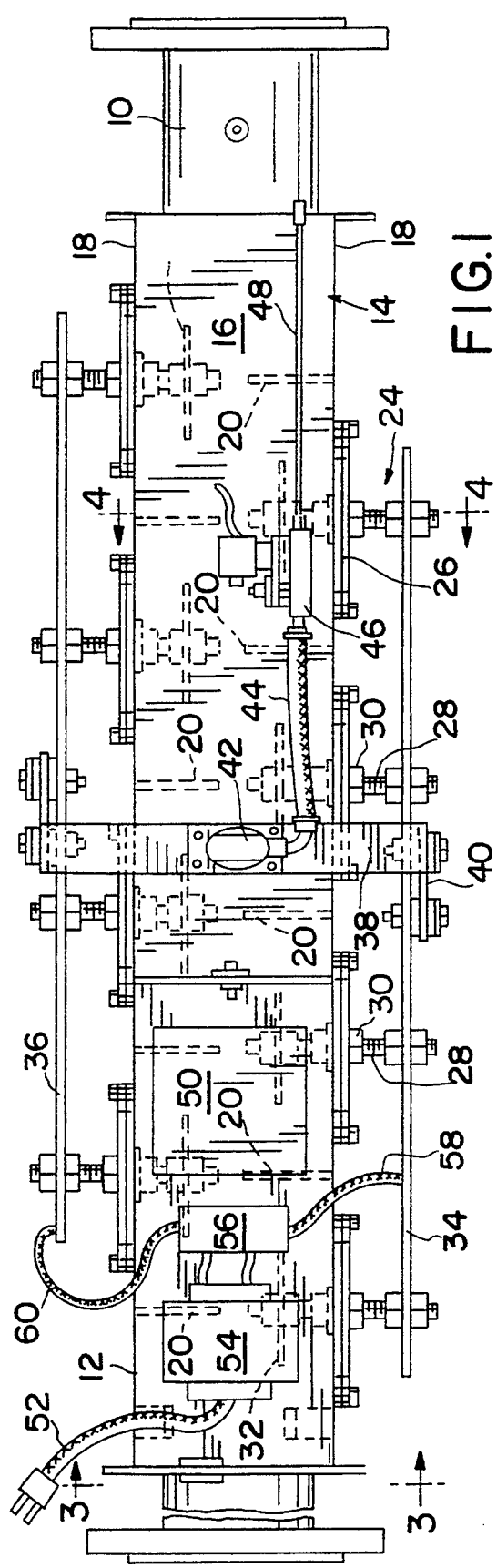
FIG. 1 is a plan view of the scale control device of the present invention.
Figure 2:
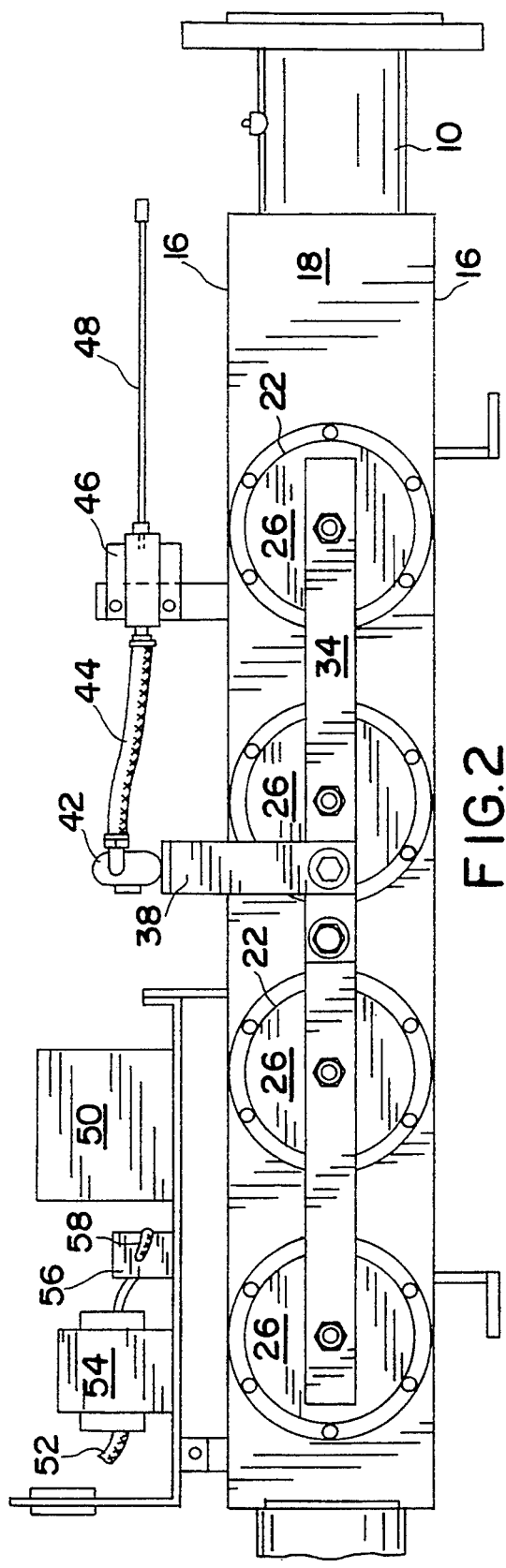
FIG. 2 is a side view of the device shown in FIG. 1.
Figure 3:
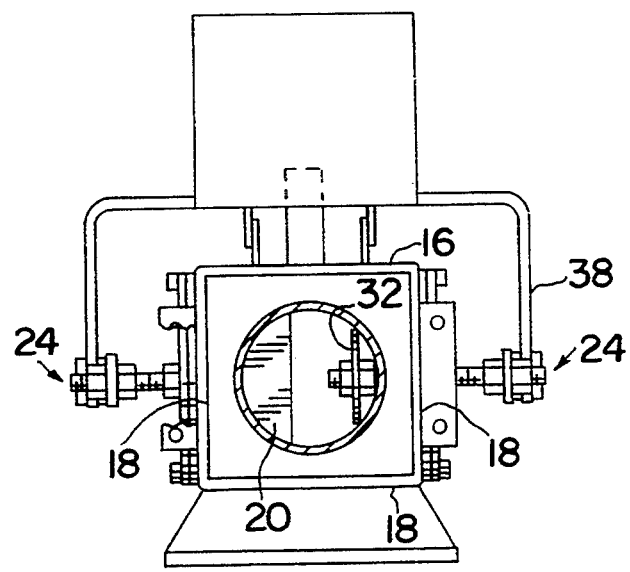
FIG. 3 is a sectional view taken along section line 3—3 of FIG. 1.

As shown in FIGS. 1 and 2, flanged inlet and outlet pipes 10 and 12 are connected to the ends of an elongated flow chamber 14 along a common longitudinal axis. The inlet and outlet pipes 10 and 12 are sealed to the chamber in order to provide a continuous flow of water therethrough. The flow chamber 14 is preferably rectangular in cross-section and comprises a pair of opposite side walls 16 which are connected by spaced top and bottom walls 18.

A plurality of internal baffles 20 are provided in the flow chamber 14 and extend alternately from the opposite side walls 16 in a spaced relationship, said baffles being secured to the top and bottom walls 18 and extending inwardly and terminating near the longitudinal center line of the flow chamber 14. The baffles 20 are staggered in such a fashion as to cause water moving through the flow chamber 14 to move in an undulating path.

A plurality of spaced openings 22, which are shown in this embodiment as being round in form, are provided in each of the side walls 16, the central axis of said openings being substantially aligned with a baffle 20 extending from the opposite side wall.

Each of the openings 22 is provided with a flexible vibrating electrode assembly, generally indicated at 24. As shown, each of the openings 22 is covered with and sealed by a disc 26 of flexible material, such as an elastomer sheet. A bolt 28 extends through the center of the flexible disc 28 into the interior of the flow chamber 14, said bolt being secured and sealed to the disc by the nut and washer assembly, generally indicated at 30. A collection electrode 32, which may be in the form of a flexible metallic disc or the like, is secured near the interior end of the bolt and is slightly spaced form the interior edge of a corresponding baffle 20. It may be seen that the plane of the disc 32 is aligned with the flow path of the water, and the opposing baffle 20 serves to direct the flow of water toward and across the surface of the electrode.

Figure 4:
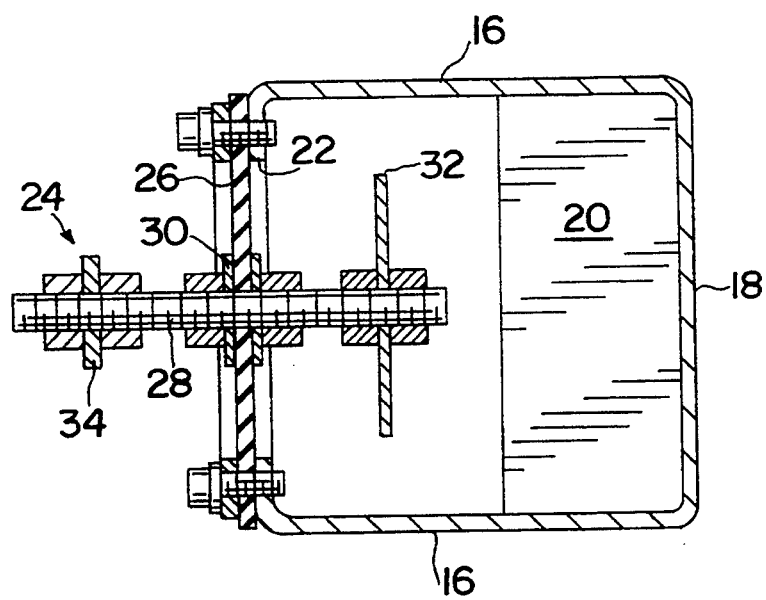
FIG. 4 is a sectional view taken along section line 4—4 of FIG. 2.

The exterior ends of the bolts 28, which extend outside of the flow chamber 14, are connected at respective Sides of the device by respective current and vibration supply bars 34 and 36, said bars being secured by means of suitable nuts or other securement means. As shown in FIGS. 1 and 4, the bars 34 and 36 are generally arranged in parallel and are connected by an inverted U-shaped cross bar 38, which extends across the top of the device and is spaced from the top wall 18 of the flow chamber 14. The depending legs of the cross bar 38 may be additionally secured to the respective bars 34 and 36 by means of a bracket 40. As shown, insulators are provided between the cross bar 38, the bracket 40 and the side bars 34 and 36, such that the side bars are electrically isolated from each other.

A vibrator unit 42 is secured to the cross bar 38 at a central location thereof. In the embodiment shown, the vibrator is of the pneumatic type and is connected by an air conduit 44 to a solenoid operated valve 46, with the other side of the valve being connected to an air supply line 48. The solenoid 46 is electrically connected to a timer 50, which periodically serves to activate the solenoid and to open and close the air valve to the vibrator unit.

Means are provided to supply the vibration bars 34 and 36 with opposite electrical charges. A supply of electric current is provided through line 52 into a transformer 54, the output voltage of which is connected to a rectifier 56 having positive and negative outputs. A wire 58 is connected from the negative side of the rectifier 56 to one of the vibration bars 34, and a second wire 60 is connected from the positive side of the rectifier to the other of the vibration bars 34. Since the bars 34 and 36 are electrically isolated from each other and from the remainder of the device, the electrodes 32 on the opposite sides of the device are provided with the opposite electrical charges. Generally, a DC voltage of 6 to 20 is sufficient for the purposes of the present invention, depending on the relative conductivity of the process stream.

In operation, positive and negative charges are applied to the opposing electrodes 32 as aforesaid while water is flowing in an undulating path through the flow chamber 14. The charged electrode surfaces selectively cause precipitation of mineral salts from the water flowing through the chamber, and the precipitate accumulates in the form of a scale on the electrode surfaces.

After the device has been energized and has been used for a period of time, a layer of scale accumulates on the electrodes, which would normally reduce their efficiency or conductivity. At this point in time, the timer 50 causes the vibrator unit 42 to operate, which in tern vibrates both of the vibration bars 34 and 36 as well as their associated electrode discs 32.

Vibration of the discs 32 causes the accumulated scale thereon to be broken up into fine particles that are carried away by the flow of water. The discs are agitated for flexed by the vibrator for a sufficient period of time to remove most or all of the accumulated scale, and the timer then deactivates the vibrator.

Once the scale has been insolublized on the electrodes and is thereafter removed the form of fine particles, the scale particles do not tend to redissolve in the water, and the water can continue to be recirculated. Alternately, the water may be passed through a filter to remove the particles, or the particles may be removed or separated by other conventional methods.

Although the scale control device of the present invention is shown as a single unit in the drawings, it is apparent that a longer unit may be employed or several units may be employed in parallel in order to increase the overall capacity of the device. For example, a plurality of units could be arranged in a stacked relation, and the individual units could be provided with a common source of electrical and vibrational supply.

I claim:

1. A water scale control device comprising an elongate chamber having a length and having a water inlet and outlet, means for providing a continuous flow of water between said inlet and outlet wherein the water has scale forming compounds therein near the saturation point, means for creating an undulating flow path of water through said chamber comprising a plurality of spaced, staggered baffles arranged along the length of said chamber, a plurality of plate electrodes within said chamber disposed in said undulating flow path near said baffles in a staggered relation, an external electrical supply means connected to said electrodes for applying opposite charges to adjacent plate electrodes and causing scale to be deposited on said electrodes, and vibrator means connected to said plate electrodes for periodically vibrating and flexing said plate electrodes for removing scale deposited thereon.

2. The water scale control device of claim 1 wherein said chamber comprises a pair of opposite walls, a plurality of openings in said walls, a flexible sheet sealing said openings, and a conductor for said external electrical supply extending through said flexible sheet and connected to said electrodes.

3. The water scale control device of claim 2 wherein said vibrator means is an external vibrator, and is connected to said conductor outside said chamber.

4. The water scale control device of claim 2 wherein said vibrator means is connected to a plurality of said conductors for conjoint vibration of a plurality of said electrodes.

5. A water scale control device comprising an elongate chamber having a water inlet and outlet and opposed sides, a plurality of spaced baffles extending inwardly into said chamber from opposite sides of said chamber in a staggered relation and defining a confined undulating water flow path through said chamber, a plurality of electrode plates disposed within said chamber in said undulating water flow path near to and spaced from said baffles, with said electrode plates being disposed in a staggered relation, a plurality of conductive rigid members extending through opposite sides of said chamber and supporting said electrode plates in said chamber, flexible insulating means for insulating said rigid means from the sides of said chamber, and means for supplying adjacent electrode plates with an opposite electrical charge.

6. The water scale control device of claim 5 wherein external vibrator means is attached to said conductive rigid members for vibrating said electrode plates.

7. The water scale control device of claim 6 wherein said conductive rigid members are secured to said electrode plates near the center thereof, and said vibrator causes flexing of said electrode plate.

8. A water scale control device comprising an elongated flow chamber having a water inlet and a water outlet, means for providing a continuous flow of water containing dissolved scale through said chamber in an undulating flow path, a plurality of spaced plate electrodes disposed in said chamber in succession in said undulating flow path, external electrical supply means connected to said plate electrodes for imparting opposite charges to successive of said plate electrodes and causing formation of scale deposits on said plate electrodes, and means for flexing said plate electrodes, for breaking up and removal of scale deposited thereon.

9. A method for treating water containing dissolved scale to prevent deposit of scale in an associated water system, said method comprising the steps of providing a flow chamber upstream of said water system, continuously flowing water in an undulating flow path through said flow chamber, disposing a plurality of spaced alternating plate electrodes in said flow path, applying opposite electrical charges to alternating plate electrodes to lower the solubility constant of the dissolved scale and to cause formation of scale on the plate electrodes without causing electrochemical reaction therewith, and periodically vibrating and flexing said spaced plate electrodes to remove deposited scale thereon.

* * * * *